(12) United States Patent
Rafalowitz et al.

(10) Patent No.: US 7,712,644 B2
(45) Date of Patent: May 11, 2010

(54) VEHICULAR TRANSPONDER INTERMEDIARY DEVICE AND SYSTEM

(76) Inventors: Karen L. Rafalowitz, 491 Farm Bridge Rd., Lake Zurich, IL (US) 60047; Ellen L. Jakubicek, 15 Georgetown Dr., Cary, IL (US) 60013

( * ) Notice: Subject to any disclaimer, the term of this patent is extended or adjusted under 35 U.S.C. 154(b) by 1134 days.

(21) Appl. No.: 11/331,310

(22) Filed: Jan. 12, 2006

(65) Prior Publication Data

US 2007/0158378 A1 Jul. 12, 2007

(51) Int. Cl.
 *B60R 11/00* (2006.01)
(52) U.S. Cl. .................. 224/482; 224/483; 224/901; 224/929
(58) Field of Classification Search .......... 224/482, 224/929, 666, 901, 585, 277, 240, 668, 930, 224/679, 483; 206/39.5, 815; 248/314, 222.12, 248/224.7; 40/591, 593, 597
 See application file for complete search history.

(56) References Cited

U.S. PATENT DOCUMENTS

| 1,739,801 | A | | 12/1929 | Pitts | |
|---|---|---|---|---|---|
| 4,184,276 | A | | 1/1980 | Hernandez | |
| D286,485 | S | | 11/1986 | Frizzell | |
| 4,827,646 | A | | 5/1989 | Miller et al. | |
| D327,070 | S | * | 6/1992 | Watanabe | D14/251 |
| 5,533,809 | A | * | 7/1996 | Gorman | 383/11 |
| 5,740,624 | A | | 4/1998 | Baseley | |
| D397,365 | S | | 8/1998 | Johnson | |
| 5,850,957 | A | | 12/1998 | Morris | |
| 5,960,572 | A | | 10/1999 | DeVito | |
| 5,961,016 | A | * | 10/1999 | Hartmann et al. | 224/571 |
| 5,996,184 | A | * | 12/1999 | Mah et al. | 24/3.12 |
| 6,127,938 | A | * | 10/2000 | Friedman | 340/693.6 |
| 6,154,997 | A | * | 12/2000 | Aluotto et al. | 42/90 |
| 6,163,997 | A | | 12/2000 | Deralas | |
| 6,362,791 | B1 | | 3/2002 | Patterson | |
| 6,446,375 | B1 | | 9/2002 | Davis | |
| 6,452,507 | B1 | * | 9/2002 | Friedman | 340/928 |
| 6,520,466 | B1 | * | 2/2003 | Blanchard et al. | 248/309.1 |
| D477,909 | S | | 8/2003 | Harris | |
| 6,658,775 | B1 | | 12/2003 | Lanzisero | |
| 6,663,063 | B2 | | 12/2003 | Tatta | |
| 2003/0047575 | A1 | * | 3/2003 | Enkerlin et al. | 224/271 |
| 2003/0136889 | A1 | * | 7/2003 | Paramonoff et al. | 248/309.1 |
| 2004/0155079 | A1 | * | 8/2004 | Shetler et al. | 224/197 |
| 2004/0245303 | A1 | * | 12/2004 | Santayana | 224/585 |
| 2006/0192677 | A1 | * | 8/2006 | Huber | 340/572.8 |

* cited by examiner

*Primary Examiner*—Nathan J Newhouse
*Assistant Examiner*—Adam Waggenspack

(57) ABSTRACT

A transponder intermediary device enables a user to selectively retain a toll transponder device in toll-paying position upon a vehicle. The transponder intermediary device comprises a transponder-receiving slot and a vehicular interface. The transponder-receiving slot comprises a superior slot end, an inferior slot end, laterally-opposed slot ends, an anterior slot portion, a posterior slot portion, an inner slot surface, and a relaxed equilibrium position. The inner slot surface is sized and shaped to snugly and removably receive transponder housing. The vehicular interface comprises certain attachment structure for attaching the transponder intermediary device in toll-paying position upon the vehicle. As the transponder housing is received in the transponder-receiving slot, the housing snap-clicks into place, thus aurally alerting the user as to when the housing is securely held by the transponder intermediary device.

5 Claims, 6 Drawing Sheets

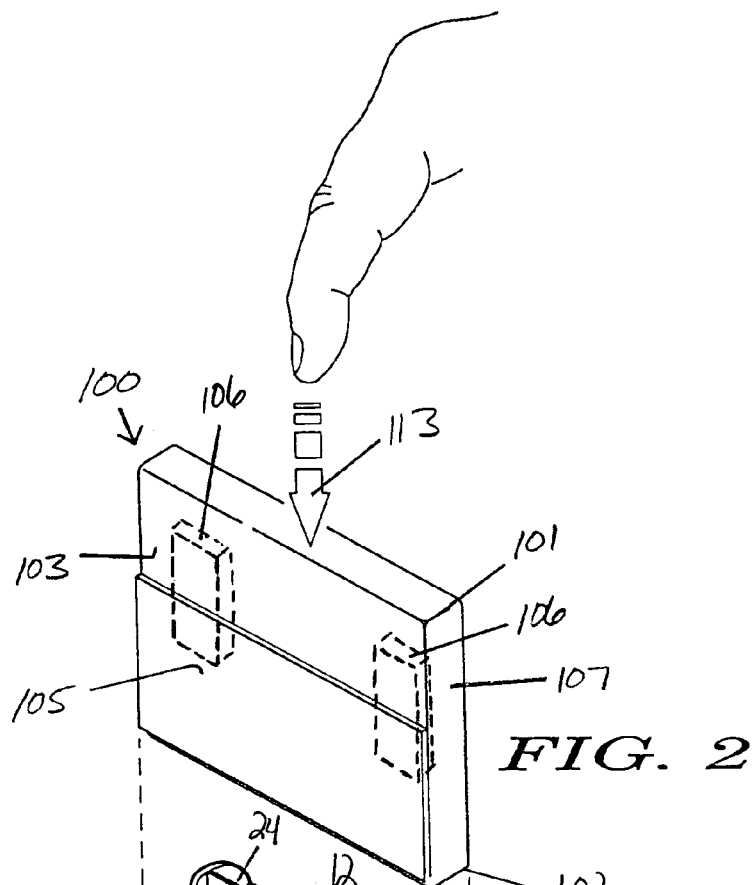
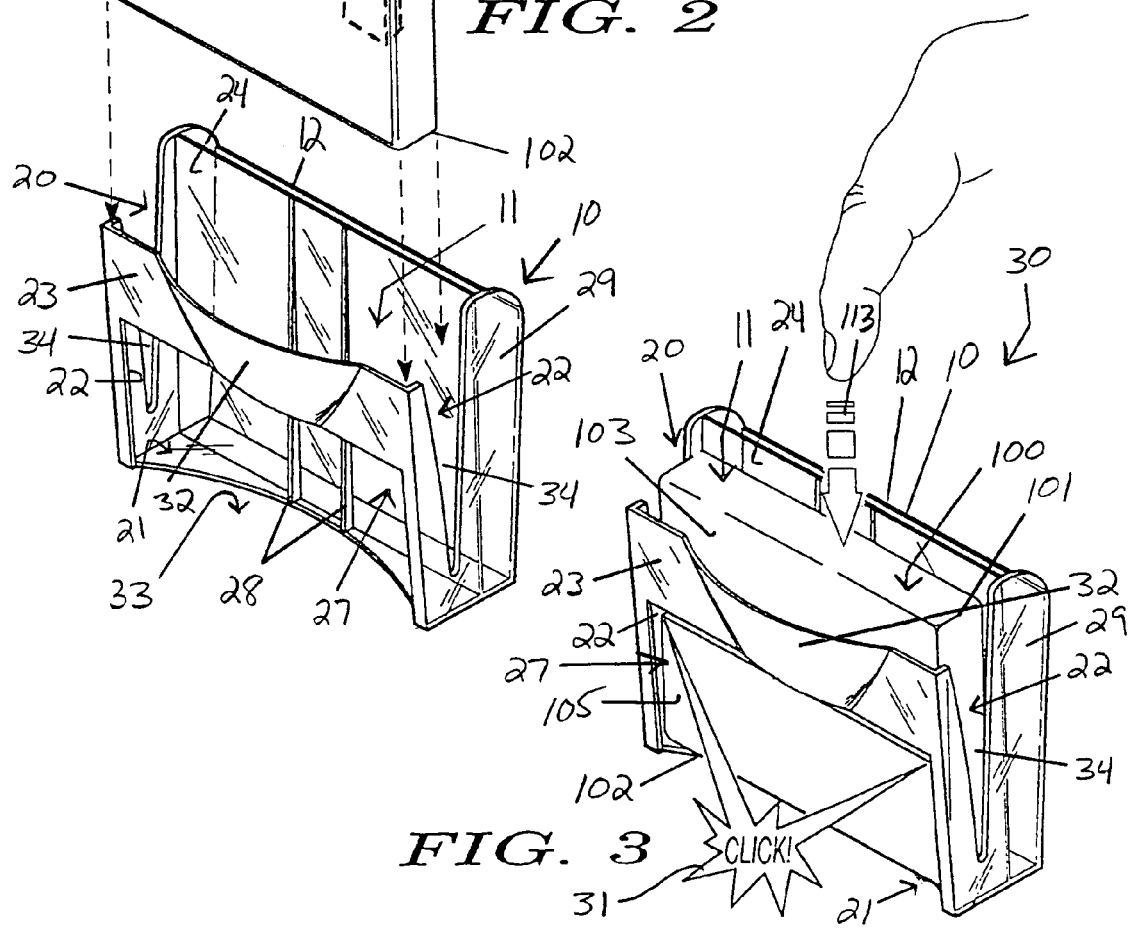
FIG. 2
FIG. 3

VEHICULAR TRANSPONDER INTERMEDIARY DEVICE AND SYSTEM

BACKGROUND OF THE INVENTION

1. Field of the Invention

The present invention generally relates to a device for interfacing between a transponder and a first transponder carrier so as to enable users thereof to manually transfer the transponder from the first transponder carrier to at least one secondary carrier. More particularly, the present invention relates to a transponder intermediary device and system for receiving and selectively retaining a vehicular toll transponder, which device is affixable in toll-paying position upon an inner windshield surface and enables sharing of a vehicular toll transponder between vehicles.

2. Description of Prior Art

Users of vehicle-mountable toll transponders are often desirous of obtaining a single toll transponder for use with multiple vehicles instead of having to obtain multiple toll transponders. The desire to utilize a single toll transponder for use in combination with multiple vehicles is underscored by the fact that many users of toll transponders have multiple vehicles. A driver, who has multiple vehicles to choose from for any trip, may choose a single vehicle for any number of reasons. The chosen vehicle could benefit from the use of a toll transponder depending on the destination and the planned route. The toll transponder, however, may be separately located from the chosen vehicle, if, for example, a different vehicle was previously used to traverse certain toll ways. It would thus be helpful if certain means were provided to enable the user to easily transfer or share a single toll transponder with multiple vehicles by way of, for example, a number of intermediary transponder devices mountable in each of a number of vehicles. A number of pertinent prior art disclosures relating to vehicular accessory holding devices and the like, however, are known. Some of the more pertinent prior art disclosures relating to toll transponder holding devices and the like are briefly described hereinafter.

U.S. Pat. No. 4,184,276 ('276 patent), which issued to Hernandez, discloses a Motor Vehicle Registration Card Holder. The '276 patent teaches a U-shaped holder made of light flexible material having grooves in the inside walls and bottom thereof forming a slot to receive an automobile registration card or plate. Affixed to one face of the holder is a layer of flexible material coated with pressure sensitive adhesive to facilitate securing the holder to the windshield of an automobile.

U.S. Pat. No. 5,850,957 ('957 patent), which issued to Morris, discloses a Vehicle Business Card Dispenser. The '957 patent teaches a business card dispenser, mountable on an exterior surface of a vehicle used by a business person, stores business cards or other promotional materials and is accessible to prospective customers located in the vicinity of the vehicle so as to permit the prospective customers to remove promotional materials from the business card dispenser. The business card dispenser preferably includes 1) a base mountable on the vehicle, e.g, by adhesive strips and 2) a card holder mounted on the base and receiving the promotional materials. The card holder is preferably removably mounted on the base to permit its removal, thus preventing theft or damage to the card holder. The card holder also incorporates measures to protect the cards from the elements. Indicia preferably are provided on the vehicle in the vicinity of the business card dispenser to draw prospective customers' attention to the business card dispenser.

U.S. Pat. No. 5,960,572 ('572 patent), which issued to DeVito, discloses a Toll Pass Holder. The '572 patent teaches a toll pass holder comprising a housing having an open top compartment with a large open front window so as to receive an electronic toll pass inserted therein. A structure such as a suction cup, functions to retain the housing to an interior surface of a windshield in a motor vehicle. The large open front window in the housing faces the interior surface of the windshield so that the electronic toll pass can operate therefrom.

U.S. Pat. No. 6,127,938 ('938 patent), which issued to Friedman, discloses an Adjustable Shield for Vehicle Mounted Toll Collection Identifier. The '938 patent teaches a holder for receiving and shielding an electronic vehicle identifying device conventionally used in conjunction with automatic toll collection. The holder includes a shielding portion which is manually actuated by the vehicle operator when it is desired to permit communication between the signal of the vehicle identifying transponder and an externally located interrogator which ascertains the presence of the vehicle.

U.S. Pat. No. 6,446,375 ('375 patent), which issued to Davis, discloses an Automobile Window Message Display Device. The '375 patent teaches a durable, lightweight, rigid, transparent envelope that is slightly curved in shape from top to bottom and attaches to automobile windows via suction cups in order to hold and display a variety of double-sided thin flexible lightweight message sheets, which are highly color-contrasted, light-reflective and contain large font character size messages in order to facilitate visual communication between automobile operators, passengers and pedestrians at distances normally encountered on streets and highways. A selected message can be displayed in the envelope through the envelope's transparent front side when it is attached to the inside of an automobile window, or a selected message can be displayed through the envelope's transparent back side while the envelope is attached to the outside of an automobile window by the same means. Indentations at the top of the envelope provide for quick and easy removal of message sheets by grasping them with the tip of a thumb and finger of the hand Small notches at the top of the envelope provide for the attachment of elastic bands in order to hold the message sheets in place inside the envelope when laying flat while not in use or being stored.

U.S. Pat. No. 6,658,775 ('775 patent), which issued to Lanzisero, discloses a Toll Pass Display Assembly and System. The '775 patent teaches a toll pass display assembly comprising a mounting plate, a suction cup and coupler. The mounting plate is fabricated of a relatively hard material and has a generally rectangular configuration. It has a front surface and a rear surface. There is a long top edge with a parallel bottom edge and two parallel side edges there between. There is next provided a suction cup which is fabricated of a flexible elastomeric material. The suction cup has an internal generally spherical concave surface and an external generally spherical convex surface with a round circumferential edge there between. Lastly, there is provided a suction cup coupler. The coupler is fabricated of the same type of flexible elastomeric material as the suction cup and formed integrally therewith. The coupler has a front section coupled to the mounting plate. A pair of hook and loop fastener strips are coupled to the front surface of the mounting plate.

U.S. Pat. No. 6,663,063 ('063 patent), which issued to Tatta, discloses a Device and Method for Supporting an Electronic Toll Pass Assembly Against the Windshield of a Vehicle. The '063 patent teaches a mounting device and method for mounting an electronic toll payment pass to the interior of a vehicle's windshield. The device is comprised of a mounting structure having a face surface and a back surface. The face surface of the mounting structure is attached to the glass of the vehicle's windshield. The electronic toll payment pass is connected to the back surface of the mounting structure in a manner that allows the electronic toll payment pass to be easily installed and removed by the driver of the vehicle. When the electronic toll payment pass is attached to the mounting structure, the mounting structure is interposed between the glass of the windshield and the electronic toll payment pass. The mounting structure preferably contains a display image. The display image is visible through the glass of the windshield and obstructs the viewing of the electronic toll payment pass.

From an inspection of the foregoing disclosures and from a consideration of other art generally known to exist it will be seen that the prior art fails to teach a toll transponder intermediary device that functions to selectively alert the user via some form of sensory stimuli that a toll transponder has been locked in cooperative assemblage with a transponder intermediary device and which further functions to allow users to easily manually remove and transfer a toll transponder from the transponder intermediary or holding device to at least one secondary intermediary device. The prior art thus perceives a need for a toll transponder intermediary device that alerts the user via sensory-stimulating means that an inserted or received toll transponder has been locked in cooperative assemblage with a transponder intermediary device and which further functions to allow users to easily manually remove and transfer a toll transponder from the transponder intermediary or holding device to at least one secondary intermediary device.

SUMMARY OF THE INVENTION

It will thus be seen, in contradistinction to the foregoing prior art, that the present invention provides a transponder intermediary device for enabling a user to selectively retain a toll transponder device in toll-paying position upon a vehicle, which toll transponder device comprises a transponder housing having a superior transponder end, an inferior transponder end, an anterior transponder face, and a posterior transponder face. The transponder intermediary device, usable in combination with the transponder housing, comprises a transponder-receiving slot and a vehicular interface. The transponder-receiving slot comprises a superior slot end, an inferior slot end, laterally-opposed slot ends, an anterior slot portion, a posterior slot portion, an inner slot surface, an outer slot surface, certain high memory constructive materials, and a relaxed equilibrium position. The inner slot surface is sized and shaped to snugly and removably receive the transponder housing. The vehicular interface comprises certain attachment means for attaching the transponder intermediary device in toll-paying position upon the vehicle.

The anterior transponder face at the inferior transponder end comprises a raised transponder-locating portion and the transponder-receiving slot further comprises a locator-receiving aperture. The transponder-locating portion is removably receivable in the locator-receiving aperture for selectively locking the transponder housing in the transponder-receiving slot to form a transponder-holder assembly. Certain structurally-enabled, aural-stimulating means function to alert the user when the transponder housing is selectively locked in the transponder-receiving slot. In this regard, the aural-stimulating means may preferably be defined by the cooperative snap-clicking action of the locator-receiving aperture as it removably receives the transponder-locating portion.

To unlock the transponder housing from the transponder-receiving slot, certain transponder-unlocking means are disclosed and preferably defined by a finger-pull portion, a transponder-push aperture, slot-expansion notches, and the high memory material. The slot-expansion notches are formed at the laterally-opposed slot ends and at least certain portions of the transponder-receiving slot are formed from high memory material. The finger-pull portion, the transponder-push aperture, the slot-expansion notches, and the high memory material are cooperatively associated with one another for enabling the user to manually displace the anterior slot portion away from the posterior slot portion at the superior slot end. The user may then manually push the transponder housing at the inferior transponder end via the transponder-push aperture. The superior transponder end is manually graspable as the transponder housing is displaced toward the superior slot end. The transponder housing is removable via the manually graspable superior transponder end. The high memory material functions to return the anterior slot portion to the relaxed equilibrium position after the transponder housing is removed from the transponder-receiving slot.

Other objects of the present invention, as well as particular features, elements, and advantages thereof, will be elucidated or become apparent from, the following description and the accompanying drawing figures.

BRIEF DESCRIPTION OF THE DRAWINGS

Other features of the invention will become more evident from a consideration of the following brief description of our patent drawings, as follows:

FIG. 2 is a frontal perspective view of the preferred embodiment of the transponder intermediary device shown in FIG. 1 with a transponder housing exploded from the transponder intermediary device and being manually inserted into the transponder intermediary device.

FIG. 3 is a frontal perspective view of the preferred embodiment of the transponder intermediary device shown in FIG. 2 with the transponder housing being manually locked into the transponder intermediary device with an auditory alert of the locked engagement.

DETAILED DESCRIPTION OF THE PREFERRED EMBODIMENT

Figure 1:
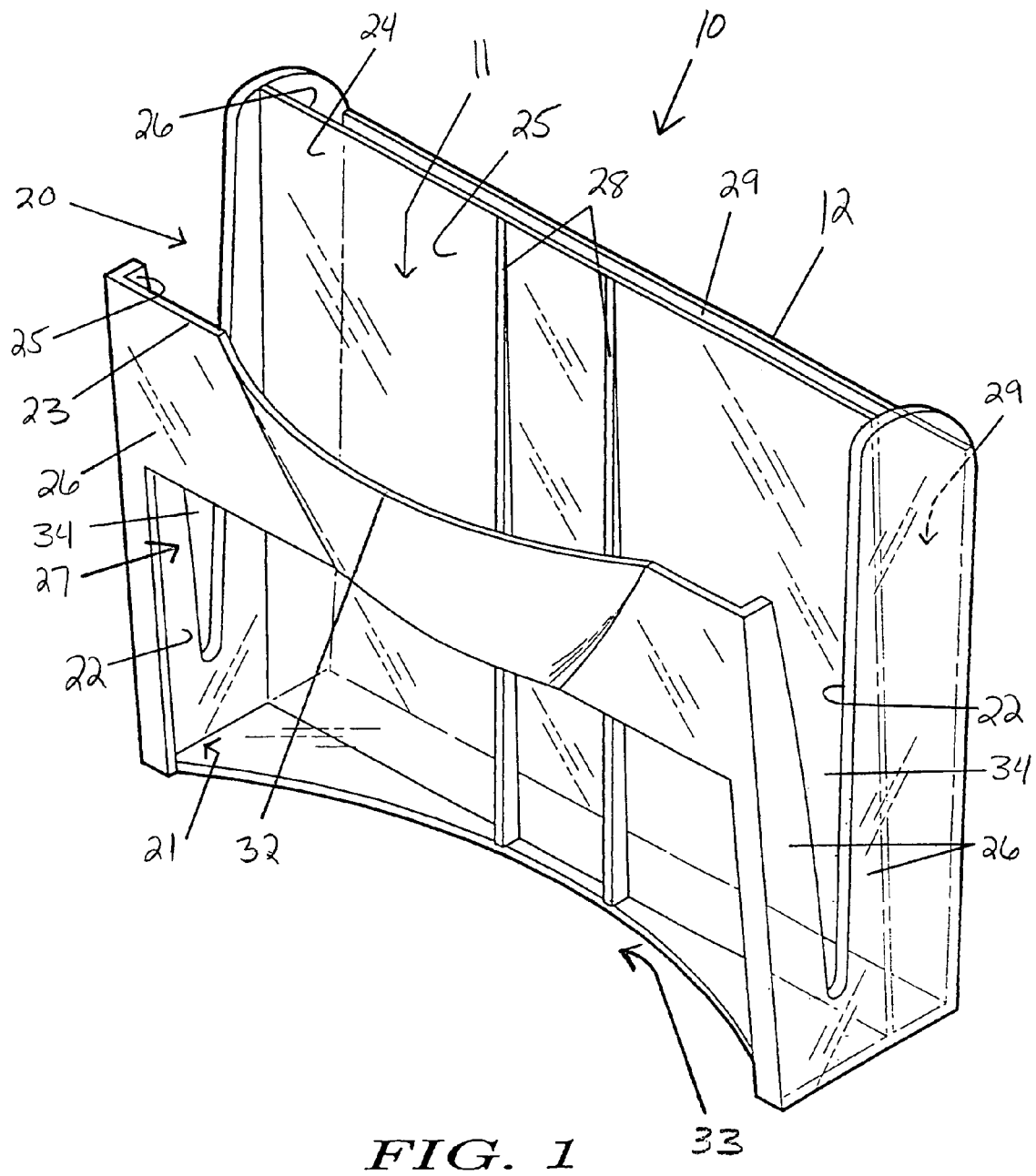
FIG. 1 is a frontal perspective view of a preferred embodiment of the transponder intermediary device.

Referring now to the drawings, the preferred embodiment of the present invention concerns a toll-type transponder intermediary device 10 and system for enabling a user or users thereof to share a single toll-type transponder device with at least two vehicles. In other words, the transponder intermediary device 10 of the present invention enables a user to selectively retain or hold a toll transponder device or transponder housing in toll-paying, transponder position upon a vehicle. In this regard, it is noted that users of vehicle-mountable toll transponders are often desirous of obtaining a single toll transponder (at some given cost) for use with multiple vehicles instead of having to obtain multiple toll transponders (at a total cost of the given cost per transponder multiplied by the number of transponders). The desire to utilize a single toll transponder for use in combination with multiple vehicles is underscored by the fact that many users of toll transponders have multiple vehicles, but do not necessarily utilize toll roads very often. A driver, who has multiple vehicles to choose from for any given trip, may choose a single vehicle for any number of reasons. The chosen vehicle could benefit from the use of a toll transponder depending on the destination and the planned route. The toll transponder, however, may be separately located from the chosen vehicle, if, for example, a different vehicle was previously used to traverse certain toll ways.

Figure 4:
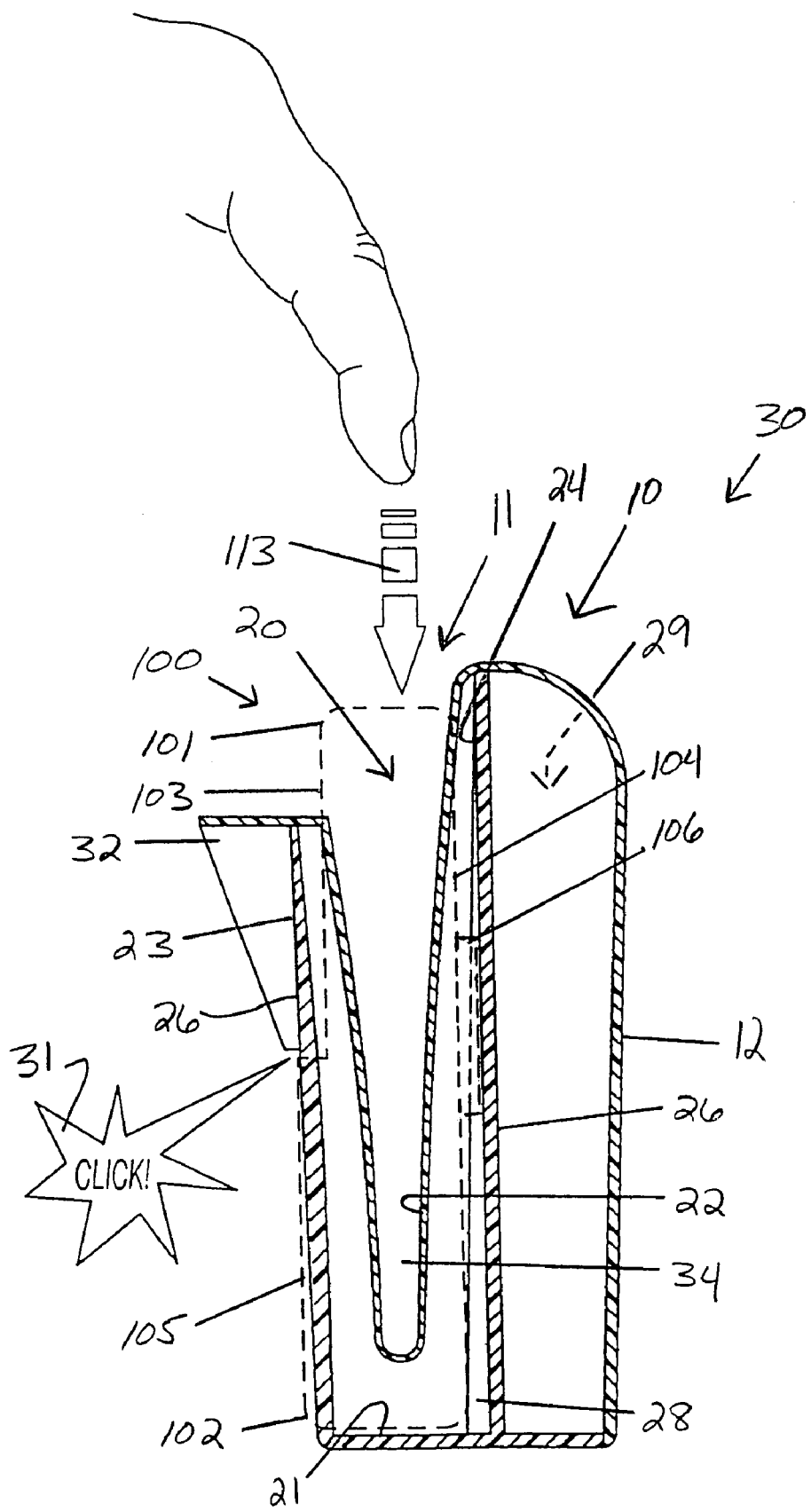
FIG. 4 is a fragmentary cross-sectional side view depiction of the preferred embodiment of the transponder intermediary device shown in FIG. 3 with the transponder housing being manually locked into the transponder intermediary device with an auditory alert of the locked engagement.
Figure 5:
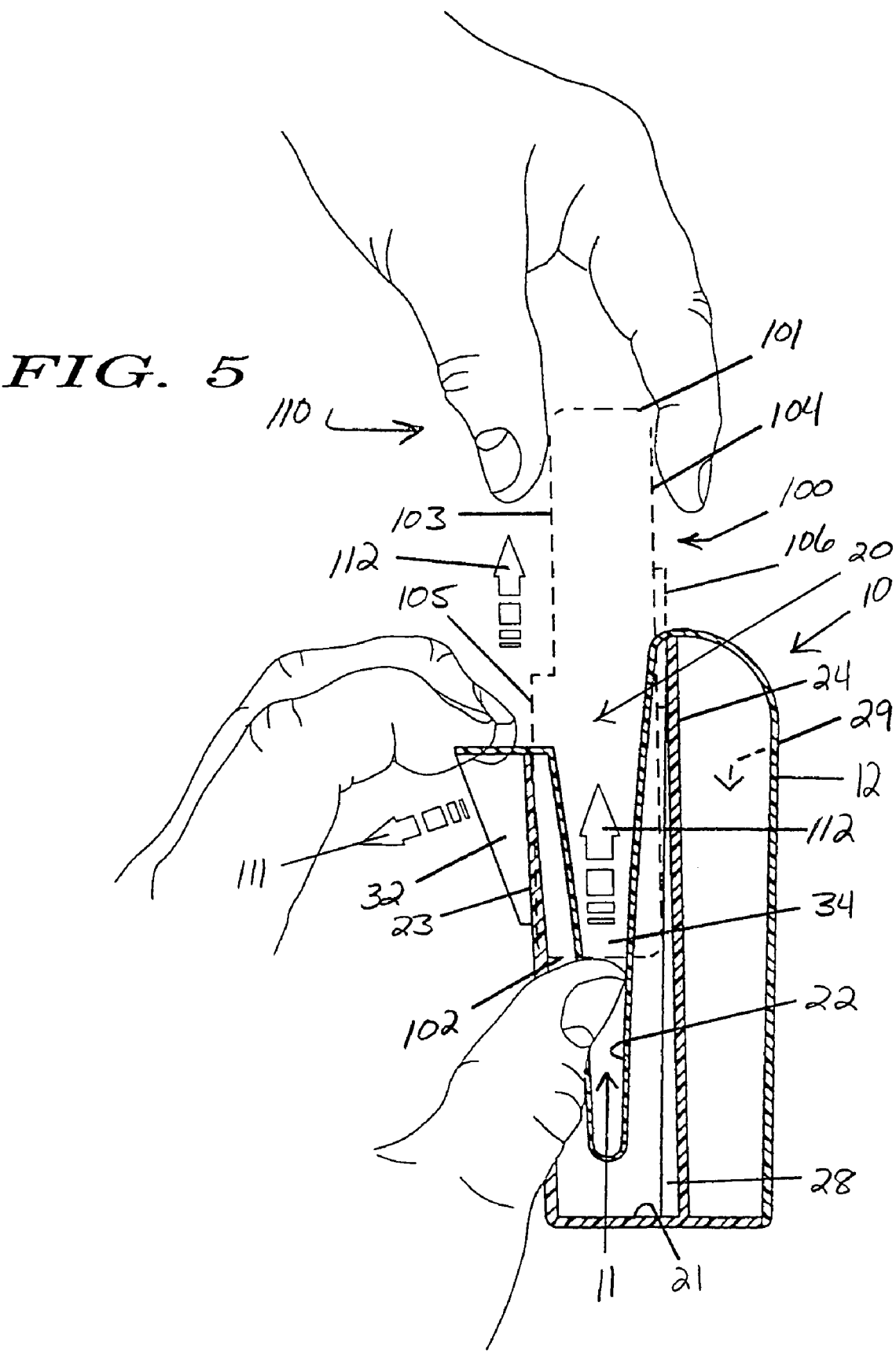
FIG. 5 is a fragmentary cross-sectional side view depiction of the preferred embodiment of the transponder intermediary device shown in FIG. 4 with the transponder housing being manually removed from the transponder intermediary device.

State of the art toll-type transponders typically used on U.S. roadways essentially comprise a transponder housing 100 as generally illustrated in solid lines in FIGS. 2 and 3 and further referenced in broken lines in FIGS. 4 and 5. Transponder housing 100 is the type of structure usable in combination with the device of the present invention and preferably comprises a superior transponder end 101 as illustrated and referenced in FIGS. 2-5; an inferior transponder end 102 as illustrated and referenced in FIGS. 2-5; an anterior transponder face 103 as illustrated and referenced in FIGS. 2-5; and a posterior transponder face 104 as illustrated and referenced in FIGS. 4 and 5. The anterior transponder face 103 at or adjacent the inferior transponder end 102 preferably comprises a raised transponder-locating portion or structure 105 as may be seen from a further inspection of FIGS. 2-5. Notably, the posterior transponder surface 104 may comprise certain laterally-opposed optional posterior transponder surface structure 106 as generally referenced in broken lines in FIGS. 1, 4, and 5. The optional posterior transponder surface structure may be defined, for example, by certain cooperative adhesive means (for example, matable hook and loop type fastening structure, the backs of which are provided with adhesive means for binding to the interface intermediate the given hook or loop fastener and the attachment surface). Notably, the optional posterior transponder surface structure 106 may be present or may be absent depending on whether the user elects to retain the structure 106 or remove the structure 106. Transponder devices 100 are typically issued to users with some sort of attachment means. Commonly, the attachment means are laterally opposed and affixed to the posterior transponder surface for directly attaching transponder devices to inner windshield surfaces. It is with this notion in mind that the structure 106 is here noted.

Figure 6A:
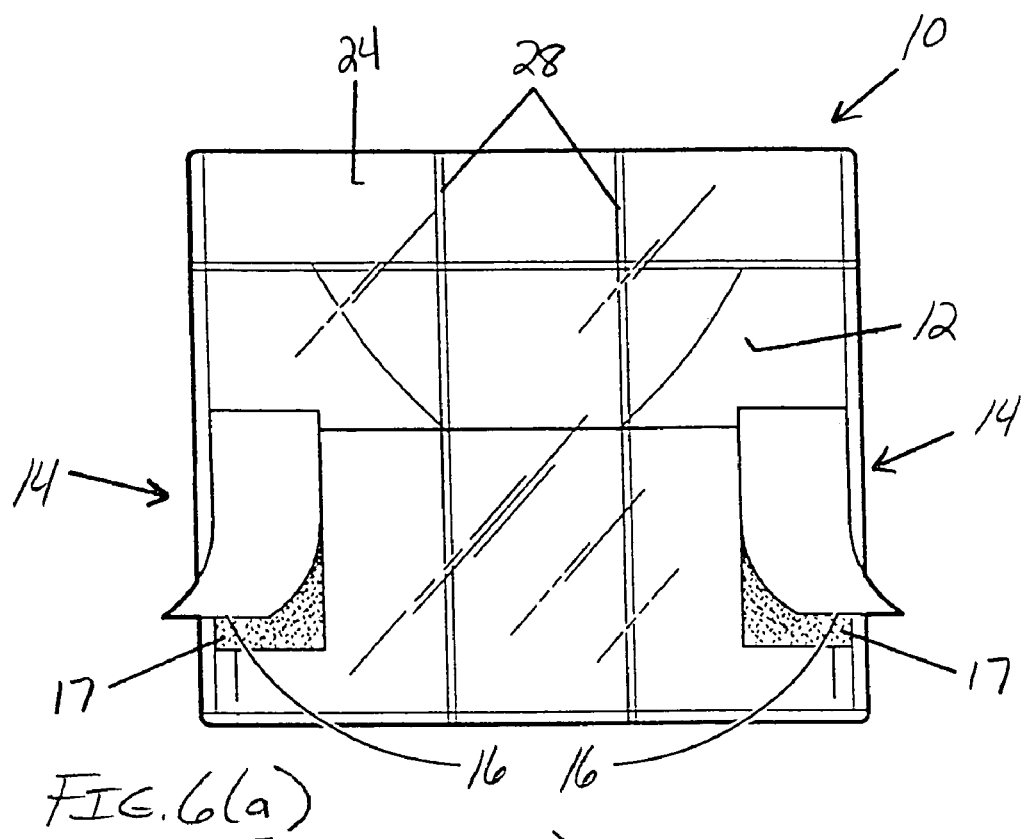
FIG. 6(a) is a back plan view of the preferred embodiment of the transponder intermediary device showing certain adhesive with peel away backing in perspective.
Figure 6:
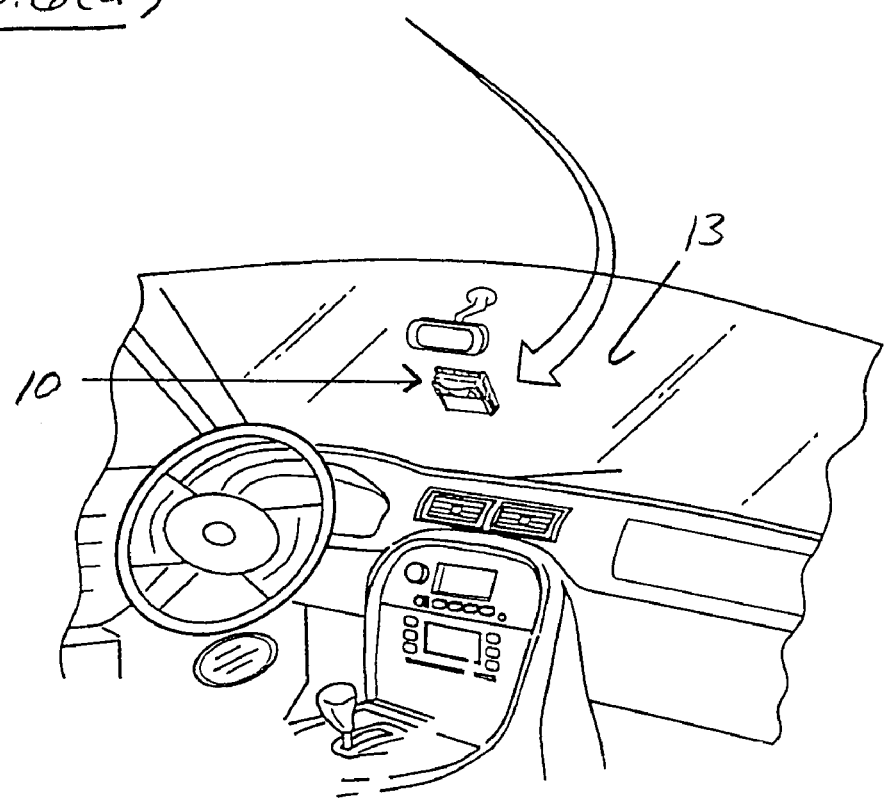
FIG. 6 is a fragmentary perspective view of a vehicular windshield and surrounding structures showing the transponder intermediary device (adhesively) affixed in toll-paying position to an inner windshield surface.
Figure 7:
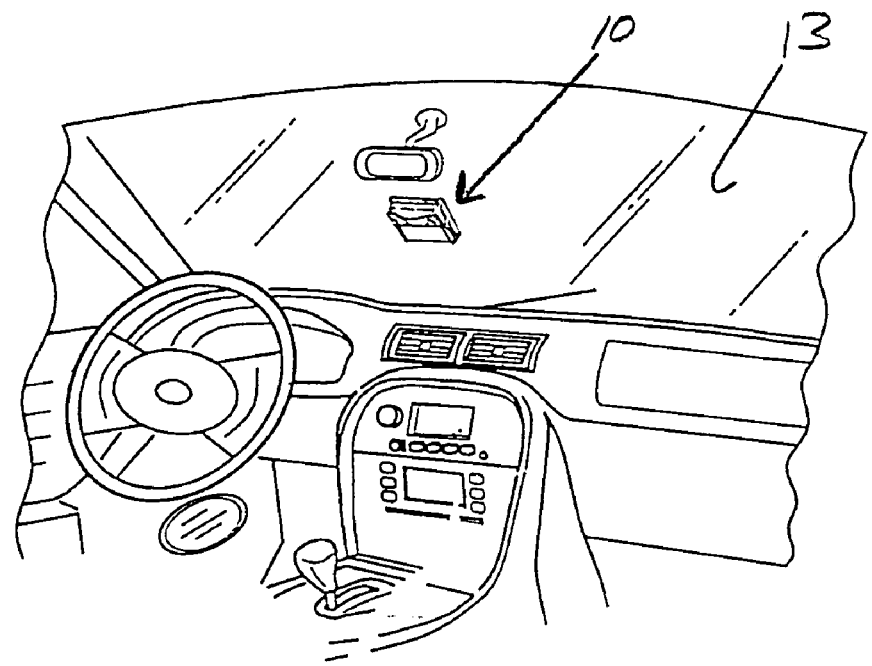
FIG. 7 is a fragmentary perspective view of two juxtaposed vehicular windshields and surrounding structures each of which show a transponder intermediary device affixed in toll-paying position to the inner windshield surface.
Figure 7:
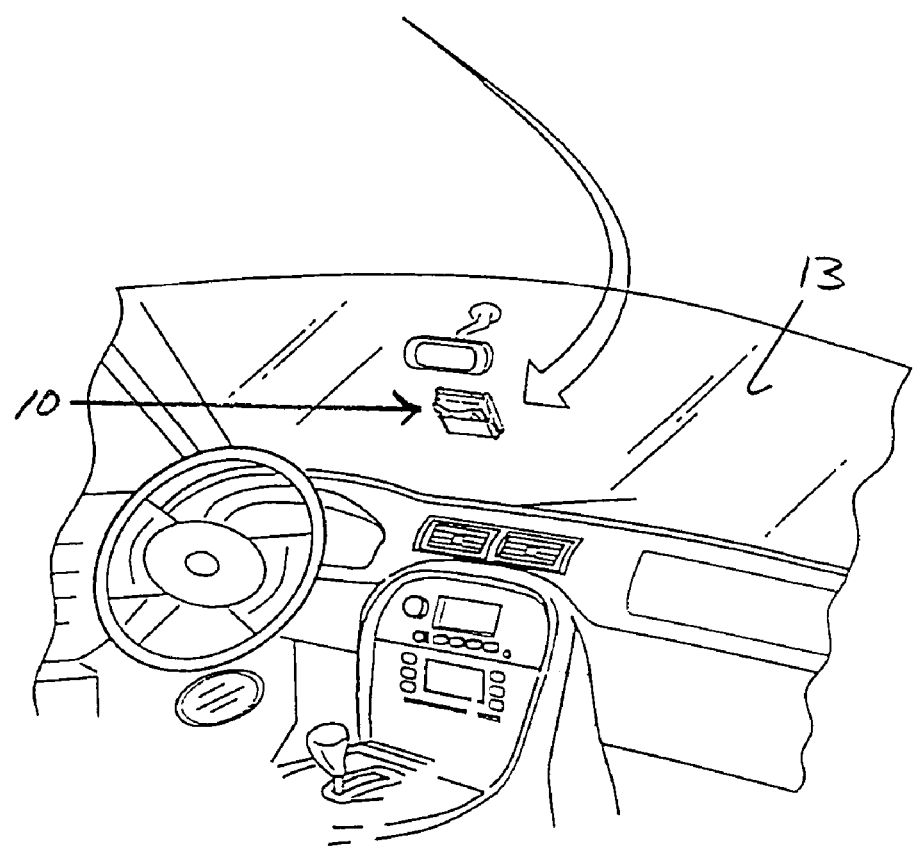

The transponder intermediary system of the present invention is thought to comprise at least two transponder intermediary devices 10 or transponder holding devices, one of which has been generally illustrated and referenced in FIGS. 1-6(*a*), and two of which have been generally illustrated and referenced in FIG. 7. Each transponder intermediary or holding device 10 is preferably constructed from molded polycarbonate material sold under the brand name IDEMITSU IR1900 TARFLON POLYCARBONATE. This particular brand of polycarbonate has yielded excellent results as achieved with a nominal tensile modulus value of 330,000 psi and nominal flexural modulus value of 341,000 psi, discussed in more detail below. Suffice it to here note that this particular brand of polycarbonate is a high memory material and will return to its relaxed equilibrium state when all outside forces are removed therefrom.

Transponder intermediary or holding device 10 preferably comprises a transponder-receiving slot 11 as illustrated and referenced in FIGS. 1-5; and a vehicular or windshield interface 12 as illustrated and referenced in FIGS. 1-6(*a*). Each windshield interface 12 preferably comprises certain (windshield) attachment means, preferably of an adhesive-based type, for fixedly attaching the transponder intermediary device(s) 10 in toll-paying position to inner windshield surface(s) 13 as generally depicted in FIGS. 6 and 7. Certain adhesive-based attachment means 14 are illustrated and referenced in FIG. 6(*a*) comprising peel-away paper backing 15 for exposing glass-mounting adhesive 17.

Each transponder-receiving slot 11 preferably comprises a superior slot end 20 as referenced in FIGS. 1-5; an inferior slot end 21 as referenced in FIGS. 1-5; two laterally-opposed slot ends 22, both of which are referenced in FIGS. 1-3, and one of which is referenced in FIGS. 4 and 5; an anterior slot portion 23 as illustrated and referenced in FIGS. 1-5; a posterior slot portion 24 as illustrated and referenced in FIGS. 1-6(*a*); an inner slot surface 25 as referenced in FIG. 1; an outer slot surface 26 as referenced in FIGS. 1 and 4; a locator-receiving aperture 27 as generally illustrated and referenced in FIGS. 1-3; and a relaxed equilibrium position as generally depicted in FIGS. 1 and 2. The relaxed equilibrium position is defined as that position the transponder-receiving slot 11 assumes when empty or when no transponder housing 100 is received therein (as generally depicted in FIGS. 1 and 2). The inner slot surface(s) are preferably sized and shaped to snugly and removably receive the transponder housing 100 as generally depicted in FIGS. 3-5.

From a comparative inspection of FIGS. 1-5, it will be seen that the transponder-locating portion or structure 105 is removably receivable in the locator-receiving aperture 27 for selectively locking the transponder housing 100 in the transponder-receiving slot 11 to form a transponder-holder assembly 30 as generally depicted in FIGS. 3 and 4. Given a transponder intermediary system comprising two or more transponder devices 10, it is contemplated that alternative first and second (windshield-affixed) transponder-holder assemblies. From a further inspection of FIGS. 3 and 4, it will be seen that the transponder intermediary system preferably comprises certain sense-stimulating means for alerting the user when the transponder housing 100 is selectively locked in the transponder-receiving slot 11. Preferably, the sense-stimulating means may be defined by certain aural-stimulating means, the aural-stimulating means for aurally alerting the user when the transponder housing 100 is selectively locked in the transponder-receiving slot 11.

Other sense-stimulating or alerting means may well function to alert the user as to the locked or unlocked status of transponder housing 100 relative to the transponder-receiving slot 11. For example, it is contemplated that the transponder-locating portion or structure 105 may well provide the user with both visual and tactile stimuli for alerting the user when the transponder housing 100 is selectively locked in the transponder-receiving slot 11. From an inspection of FIG. 4, for example, it will be seen that the outer slot surface 26 at the anterior slot portion 23 is substantially flush with the raised transponder-locating portion or structure 105. Certain structural features, as incorporated in the design of the present device, may thus serve to define the sense-stimulating means as heretofore specified. Notably, however, the aural-stimulating means may preferably be defined by cooperative snap-clicking action as depicted by a cartoonish "click" sound 31. As the locator-receiving aperture 27 removably receives and locks the transponder-locating portion 105 into place, a "click" or click-type sound may be heard. It is further contemplated that if the transponder-locating portion 105 is formed to be substantially flush with the outer slot surface 26 at the anterior slot portion 23, the same structural relationship will provide for a smooth outer assembly surface, which surface may essentially function to enhance the overall visual appeal of the transponder-holder assembly 30.

The transponder-receiving slot 11 may further preferably comprise certain transponder-wedging means for cooperatively wedging the anterior transponder face 103 and the posterior transponder face 104 intermediate the anterior slot portion 23 and the posterior slot portion 24 as the inner slot surface(s) 25 snugly and removably receive the transponder housing 100. Preferably, the transponder-wedging means may be cooperatively associated with the posterior slot portion 24 and in this regard, it is contemplated that the transponder-wedging means may be defined by a pair of laterally-opposed, slanted ridges 28 as illustrated and referenced in FIGS. 1, 2, 4, 5, and 6(*a*). It will be seen from an inspection of the noted figures that the laterally-opposed slanted ridges 28 have minimal dimensions adjacent the superior slot end 20 and maximal dimensions adjacent the inferior slot end 21. Thus, as transponder housing 100 is inserted into transponder-receiving slot 11 (as generally depicted at vector arrows 113 in FIGS. 2-4), transponder housing 100 may preferably be wedged intermediate anterior slot portion 23 and the posterior slot portion 24. Notably, the posterior transponder surface structure 106 is typically laterally spaced and in this regard, it is further contemplated that ridges 28 are also preferably laterally spaced so as to cooperatively receive laterally-opposed posterior transponder surface structure 106 (if present.

Central to the invention is the (auditory) locking action of the assembled transponder housing 100 in transponder-receiving slot 11. In this regard, it is contemplated that certain transponder-unlocking means may be associated with the transponder-receiving slot. Preferably, the transponder-unlocking means are manually (via a user's fingers or hands) enabled. It is contemplated that the transponder-unlocking means function to enable the user to manually unlock the transponder-locating portion 105 from the locator-receiving aperture 27 thus further enabling the user to remove the transponder housing 100 from the transponder-receiving slot 11. The transponder-unlocking means may preferably be defined by a finger-pull portion 32 as illustrated and referenced in FIGS. 1-5; a transponder-push aperture 33 as illustrated and referenced in FIGS. 1 and 2; slot-expansion notches 34 as illustrated and referenced in FIGS. 1-5; and high memory material (as prefatorily alluded to).

The slot-expansion notches 34 are preferably formed at the laterally-opposed slot ends 22 and at least certain portions of the transponder-receiving slot 11 (i.e. the junction intermediate the slot ends 22 and the inferior slot end 21) are formed from the preferred high memory material. It will be seen from an inspection of FIG. 5 that the finger-pull portion 32, the transponder-push aperture 33, the slot-expansion notches 34, and the high memory material are cooperatively associated with one another for enabling the user to manually displace the anterior slot portion 23 away from the posterior slot portion 24 at the superior slot end 20 (as depicted at vector arrow 111) and further enabling the user to manually push the transponder housing 100 at the inferior transponder end 102 via the transponder-push aperture 33.

During this cooperative structural interplay, the high memory material enables the user to stress the junction(s) inferior to the slot expansion notches 34. Being stressed, the high memory material tends back toward its relaxed state, but provides enough play to allow the user to manually remove the transponder housing 100 as specified. The superior transponder end 101 is manually graspable (as generally depicted at reference numeral 110 in FIG. 5) as the transponder housing 100 is displaced toward the superior slot end 20 (as generally depicted at vector arrows 112 in FIG. 5). The transponder housing 100 is thus removable via the manually graspable superior transponder end 101 and the high memory material functions to return the anterior slot portion 23 to the relaxed equilibrium position after the transponder housing 100 is removed from the transponder-receiving slot 11.

As noted by the foregoing, the superior transponder end 101 is manually graspable as the transponder housing 100 is displaced toward the superior slot end 20 and the transponder housing 100 is removable via the manually graspable superior transponder end 101. In this regard, it is further contemplated that the transponder intermediary device 10 may preferably comprise certain spacing means for enabling the user to manually receive (via the user's fingers or hands) the posterior transponder surface 104 at the superior transponder end 101 when the transponder housing 100 is removed from the transponder-receiving slot 11. It is contemplated that if the outer slot surface 26 at the posterior slot portion 24 were to be affixed directly to a windshield surface 13, the manual removal of transponder housing 100 may prove difficult unless the transponder intermediary device 10 were to provide certain spacing means intermediate the transponder-receiving slot 11 and the windshield interface 12. The spacing means may preferably be defined as a finger-receiving slot 29 or spacer box as generally referenced in FIGS. 1-5. Finger-receiving slot 29 is essentially a spacer slot for enabling the user to manually receive the posterior transponder surface 104 at the superior transponder end 101 when the transponder housing 100 is removed from the transponder-receiving slot 11 as earlier specified.

While the foregoing descriptions contain much specificity, the same should not be construed as limiting the scope of the invention, but rather as an exemplification of the invention. For example, it is contemplated that the essence of the invention teaches a transponder holding device for receiving and selectively locking a (toll) transponder device in cooperative assemblage therewith, which transponder device essentially comprises certain transponder-locating structure (such as raised transponder-locating portion 105). The transponder holding device of the present invention essentially comprises certain locator-receiving structure (such as locator-receiving aperture 27). The transponder-locating structure of the transponder device is cooperable with the locator-receiving structure of the transponder holding device for selectively locking the transponder device in assembled relation with the transponder holding device. Certain sense-stimulating means function to alert the user when the transponder device is selectively locked in assembled relation with the transponder holding device. The sense-stimulating means may preferably be defined by aurally-stimulating, snap-clicking action of the locator-receiving structure as the same selectively locks the transponder-locating structure.

The transponder holding device may further preferably comprises certain (manually-operable) transponder-unlocking means, the transponder-unlocking means for enabling the user to manually unlock the transponder-locating structure from the locator-receiving structure thus further enabling the user to remove the transponder device from the transponder holding device. The transponder holding device may preferably comprise a vehicular interface and certain spacing means. The vehicular interface comprises certain vehicular-attaching means for attaching the transponder holding device in toll-paying position upon a vehicle and the spacing means extend intermediate the vehicular interface and the locator-receiving structure for enabling a user to manually grasp the transponder device as the transponder device is removed from the transponder holding device.

As earlier specified, the raised transponder-locating portion 105 is preferably formed at the anterior transponder face 103 adjacent the inferior transponder end 102 and the cooperative locator-receiving aperture 27 is formed at the anterior slot portion 23 adjacent the inferior slot end 21. This arrangement need not be the case. So long as the transponder housing comprises some transponder-locating structure and so long as the transponder-receiving slot comprises some cooperable locator-receiving structure that together function to selectively lock the transponder housing in assemblage with the transponder holding device, it is believed that the spirit of the invention is practiced. For example, the raised transponder-locating structure could be cooperatively associated with the posterior transponder surface and the locator-receiving structure could be cooperatively associated with the posterior slot portion and together the cooperable features could function to selectively lock the transponder housing in assemblage with the transponder holding device.

Further, it is contemplated that the transponder-wedging means essentially function to wedge select transponder faces (as selected from the group consisting of the anterior transponder face 103, the posterior transponder face 104, and the laterally-opposed end transponder faces 107, one of which is referenced in FIG. 2) intermediate select slot portions (as selected from the group consisting of the anterior slot portion 23, the posterior slot portion 24, and the laterally-opposed slot ends 22) as the inner slot surface snugly and removably receives the transponder housing.

The transponder-unlocking means may be defined by certain select slot-expansion portions (as selected from the group comprising the anterior slot portion 23, the posterior slot portion 24, and the laterally-opposed slot ends (if, for example, the high memory material allowed for lateral expansion), certain transponder-push means, and certain high memory material. The slot-expansion portions, transponder-push means, and certain high memory material are cooperatively associated with one another for enabling the user to manually displace opposing select slot portions away from one another (to release wedged engagement or to release the locking cooperative engagement intermediate the transponder-locating structure and the locator-receiving structure) and for further enabling the user to manually push the transponder housing at the inferior transponder end via the transponder-push aperture(s). The superior transponder end is thus manually graspable as the transponder housing is displaced toward the superior slot end and the transponder housing is removable via the manually graspable superior transponder end.

Accordingly, although the invention has been described by reference to a preferred embodiment, it is not intended that the novel assembly be limited thereby, but that modifications thereof are intended to be included as falling within the broad scope and spirit of the foregoing disclosure, the following claims, and the appended drawings.

We claim:

1. A transponder system, said transponder system comprising, in combination:

a transponder device, the transponder device comprising a housing, the housing comprising opposed superior and inferior housing ends, and opposed anterior and posterior housing faces, the anterior housing face comprising a raised transponder-locating portion; and a transponder intermediary device made from a high memory material and comprising an inferior wall, an anterior wall having superior and inferior portions, a posterior wall, and two laterally opposed sidewalls, a windshield interface, a manually graspable finger-pull portion located on the anterior wall, the anterior wall spanning the entire width between the sidewalls, and a locator-receiving aperture located on the inferior portion of the anterior wall and allowing a user to push on the transponder device through the locator-receiving aperture, the inferior wall, anterior wall, and posterior wall together with the sidewalls defining between them a transponder-receiving slot for receiving the transponder, the sidewalls each including a slot-expansion notch formed therein, the slot-expansion notches in combination with the high memory material composition of the sidewalls and anterior wall allowing a user to manually displace the superior portion of the anterior wall away from the posterior wall by grasping and pulling the finger-pull portion, enabling the user to manually unlock the transponder-locating portion from the locator-receiving aperture, thus enabling the user to remove the housing from the transponder-receiving slot, the high memory material automatically returning the superior portion of the anterior wall to its original position when it is released by the user, the windshield interface comprising windshield-attachment means for attaching the transponder intermediary devices in a toll-paying position to an inner windshield surface, the transponder-receiving slot being sized and shaped to snugly and removably receive the housing, the transponder-locating portion being removably receivable in the locator-receiving aperture for selectively locking the housing in the transponder-receiving slots.

2. The transponder intermediary system of claim 1, wherein because the anterior wall is made of a high memory material, it will audibly snap into a locking position as the transponder-locating portion is received within the transponder-locating aperture.

3. The transponder system of claim 1 further comprising spacing means, the spacing means extending intermediate the posterior wall and the windshield interface for enabling the user to manually receive the posterior housing surface at the superior housing end when the housing is removed from the transponder-receiving slot.

4. The transponder system of claim 1 further comprising a pair of ridges formed upon the posterior wall which are laterally spaced from one another, the ridges for cooperatively wedging the anterior and posterior housing faces intermediate the anterior and posterior walls as the transponder device is placed within the transponder-receiving slot.

5. The transponder system of claim 1 wherein the transponder-locating portion is substantially flush with the outer surface of the anterior wall for providing a smooth outer assembly surface, the smooth outer assembly surface for enhancing the visual appeal of the transponder system.

* * * * *